US010492638B2

(12) United States Patent
Guegan et al.

(10) Patent No.: US 10,492,638 B2
(45) Date of Patent: Dec. 3, 2019

(54) STEAM COOKER ACCESSORY FOR STEAM HEATING AND/OR COOKING FOODS CONTAINED IN A CONTAINER

(71) Applicant: SEB S.A., Ecully (FR)

(72) Inventors: Laurent Guegan, Lornay (FR); Laurent Blond, Beaune (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/736,948

(22) PCT Filed: Jun. 13, 2016

(86) PCT No.: PCT/FR2016/051431
§ 371 (c)(1),
(2) Date: Dec. 15, 2017

(87) PCT Pub. No.: WO2016/203144
PCT Pub. Date: Dec. 22, 2016

(65) Prior Publication Data
US 2018/0168383 A1   Jun. 21, 2018

(30) Foreign Application Priority Data

Jun. 16, 2015 (FR) .................................. 15 55516
May 31, 2016 (FR) .................................. 16 54921

(51) Int. Cl.
*A47J 27/00* (2006.01)
*A47J 27/04* (2006.01)
(52) U.S. Cl.
CPC ............. *A47J 27/04* (2013.01); *A47J 27/004* (2013.01); *A47J 2027/043* (2013.01)

(58) Field of Classification Search
None
See application file for complete search history.

(56) References Cited

U.S. PATENT DOCUMENTS 2,786,932 A    3/1957  Lewis
4,509,412 A *  4/1985  Whittenburg ........... A47J 27/04
                                                    126/20

(Continued)

FOREIGN PATENT DOCUMENTS

FR      2 614 976 A1    11/1988
JP      S52-45785 U      3/1977

(Continued)

OTHER PUBLICATIONS

International Search Report as issued in International Patent Application No. PCT/FR2016/051431, dated Oct. 7, 2016.

(Continued)

*Primary Examiner* — Joseph M Pelham
(74) *Attorney, Agent, or Firm* — Pillsbury Winthrop Shaw Pittman LLP

(57) ABSTRACT

A steam cooker accessory for steam heating and/or cooking foods contained in a container, the steam cooker accessory includes a steam generator including a steam production chamber, the steam cooker accessory including a water tank supplying water to the steam production chamber, the steam production chamber being connected to at least one steam delivery outlet provided in a lower part of the steam generator. The steam generator has at least one vent bringing the lower part of the steam generator into communication with an external part of the steam generator extending above the lower part.

17 Claims, 3 Drawing Sheets

(56) References Cited

U.S. PATENT DOCUMENTS

Figure 1:
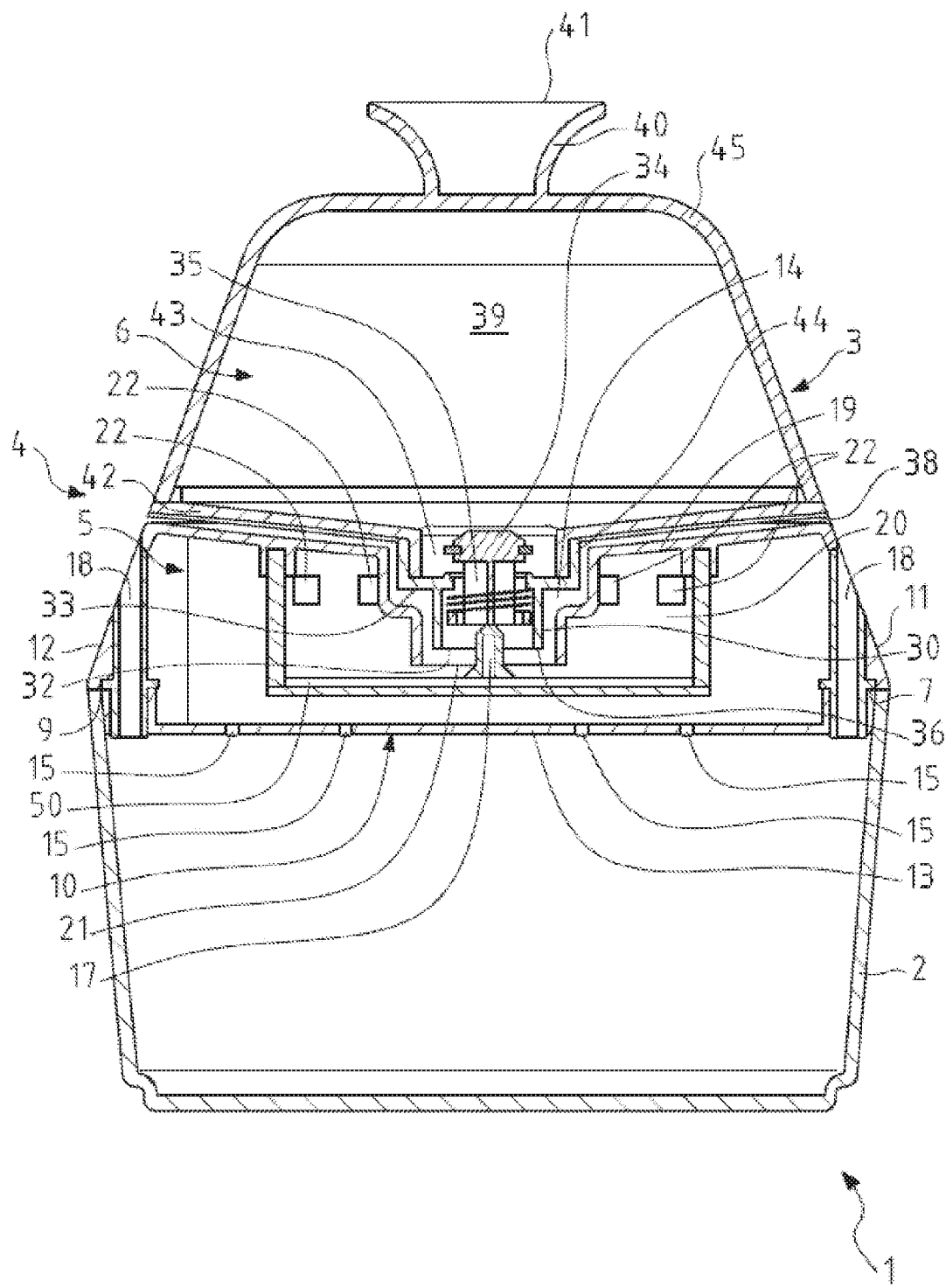

| | | | | |
|---|---|---|---|---|
| 5,653,161 | A | * 8/1997 | Nopanen | A47J 27/04 |
| | | | | 126/369 |
| 5,756,968 | A | * 5/1998 | Chung | A47J 27/04 |
| | | | | 219/428 |
| 6,530,308 | B1 | 3/2003 | Lin | |
| 2002/0060216 | A1 | * 5/2002 | Chan | A47J 27/04 |
| | | | | 219/430 |
| 2004/0020374 | A1 | * 2/2004 | Rossi | A47J 27/04 |
| | | | | 99/410 |
| 2008/0229936 | A1 | * 9/2008 | Kaneko | A21B 3/04 |
| | | | | 99/357 |
| 2014/0103023 | A1 | 4/2014 | Kao | |
| 2016/0150915 | A1 | * 6/2016 | Yu | A47J 36/32 |
| | | | | 99/327 |
| 2016/0220058 | A1 | * 8/2016 | Rocklinger | A47J 27/04 |
| 2017/0007064 | A1 | * 1/2017 | Chen | A47J 27/04 |
| 2017/0095104 | A1 | * 4/2017 | Kataoka | A47J 27/00 |
| 2017/0127871 | A1 | * 5/2017 | Leung | A47J 27/04 |

FOREIGN PATENT DOCUMENTS

| | | |
|---|---|---|
| JP | H09-19366 A | 1/1997 |
| JP | H09-327379 A | 12/1997 |

OTHER PUBLICATIONS

International Preliminary Report on Patentability and the Written Opinion of the International Searching Authority as issued in International Patent Application No. PCT/FR2016/051431, dated Dec. 19, 2017.

* cited by examiner

STEAM COOKER ACCESSORY FOR STEAM HEATING AND/OR COOKING FOODS CONTAINED IN A CONTAINER

CROSS-REFERENCE TO RELATED APPLICATIONS

This application is the U.S. National Stage of PCT/FR2016/051431, filed Jun. 13, 2016, which in turn claims priority to French patent application number 1555516 filed Jun. 16, 2015 and French patent application number 1654921 filed May 31, 2016. The content of these applications are incorporated herein by reference in their entireties.

This invention concerns the technical field of steam production appliances and devices for steam heating and/or cooking foods.

More specifically, this invention concerns steam cooking accessories for steam heating and/or cooking foods contained in a container.

This invention also concerns appliances for steam heating and/or cooking foods, comprising a container associated with a steam production device forming such a steam cooker accessory.

From document US 2014/0103023, we know of an appliance comprising a steam production accessory used for steam heating and/or cooking foods contained in a container. This steam production accessory comprises a steam generator comprising a steam production chamber and a water tank supplying water to the steam production chamber. The steam production chamber is connected to steam delivery outlets provided in a lower part of the steam generator above the container.

One drawback of this appliance is that it is necessary to use caution when filling the water tank of the steam generator because of the presence of the steam generator.

One objective of this invention is to propose a steam cooker accessory used with a container for steam heating and/or cooking foods, in which the filling of the water tank is facilitated.

Another objective of this invention is to propose a steam cooker accessory used with a container for steam heating and/or cooking foods, which is economical to construct.

Another objective of this invention is to propose a steam cooker accessory used with a container for steam heating and/or cooking foods, which offers good steam production performance.

Another objective of this invention is to propose an electric steam cooker for steam heating and/or cooking foods, which comprises a container and a steam cooker accessory and in which the filling of the water tank is facilitated.

Another objective of this invention is to propose an electric steam cooker for steam heating and/or cooking foods, which comprises a container and a steam cooker accessory and which is economical to construct.

Another objective of this invention is to propose an electric steam cooker for steam heating and/or cooking foods, which comprises a container and a steam cooker accessory and which offers good steam production performance.

These objectives are achieved with a steam cooker accessory for steam heating and/or cooking foods contained in a container, the steam cooker accessory comprising a steam generator comprising a steam production chamber, the steam cooker accessory comprising a water tank supplying water to the steam production chamber, the steam production chamber being connected to at least one steam delivery outlet provided in a lower part of the steam generator, because the steam generator has at least one vent bringing the lower part of the steam generator into communication with an external part of the steam generator extending above the lower part. This arrangement permits better control of the escape of steam from the container closed by the steam generator.

Advantageously then, the steam generator has an annular lower bearing surface. This arrangement permits placing the steam generator on the top edge of a container.

Advantageously then, the said at least one vent is surrounded by the annular lower bearing surface. This arrangement permits balancing the pressure inside the container closed by the steam generator, while controlling the escape of steam from the container closed by the steam generator.

Advantageously again, the steam generator has an external side wall and the steam production chamber is arranged in the steam generator at a distance from the external side wall. These arrangements permit limiting the temperature of the external side wall of the steam generator.

Advantageously then, the said at least one vent discharges in the external side wall. This arrangement permits increasing the size of the receiving area of the removable water tank.

Advantageously again, the steam generator has a lower part in which is formed the said at least one steam delivery outlet, and the steam production chamber is arranged in the steam generator at a distance from the lower part. These arrangements permit a steam delivery chamber beneath the steam production chamber, which permits more freedom in the arrangement of the steam delivery outlets.

These objectives are also achieved with an electric steam cooker comprising a container to contain the foods to be steam cooked and/or heated, and a cover with a lower face to be positioned on the container, because the cover comprises a steam cooker accessory according to at least one of the aforementioned characteristics.

Figure 2:
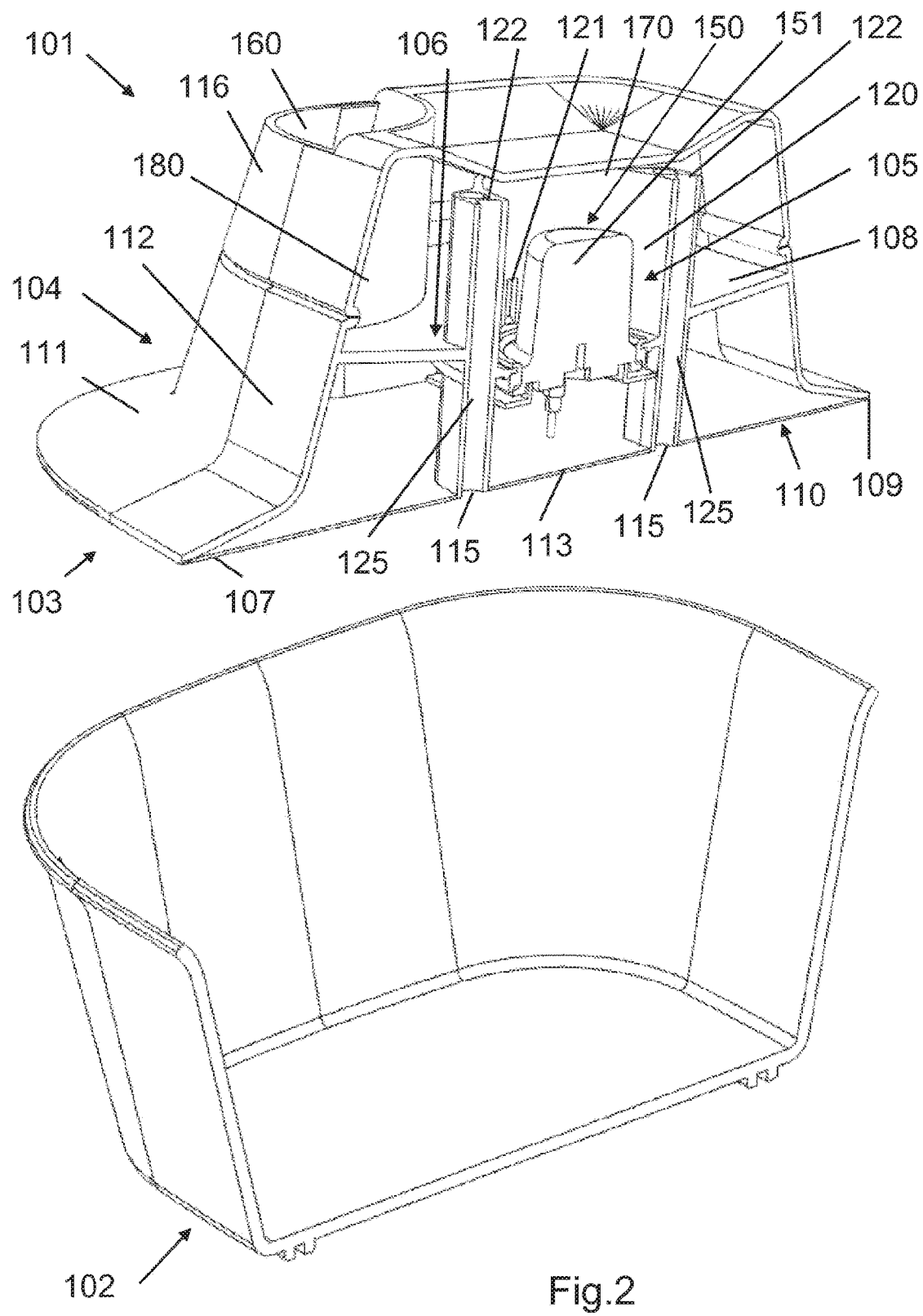
Figure 3:
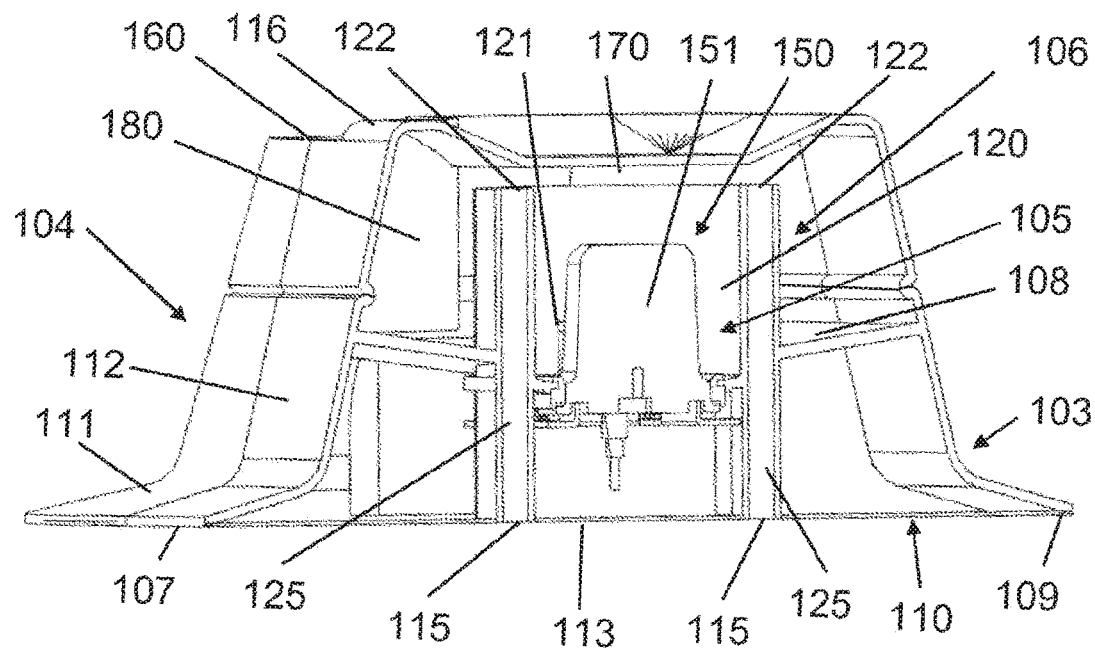
Figure 4:
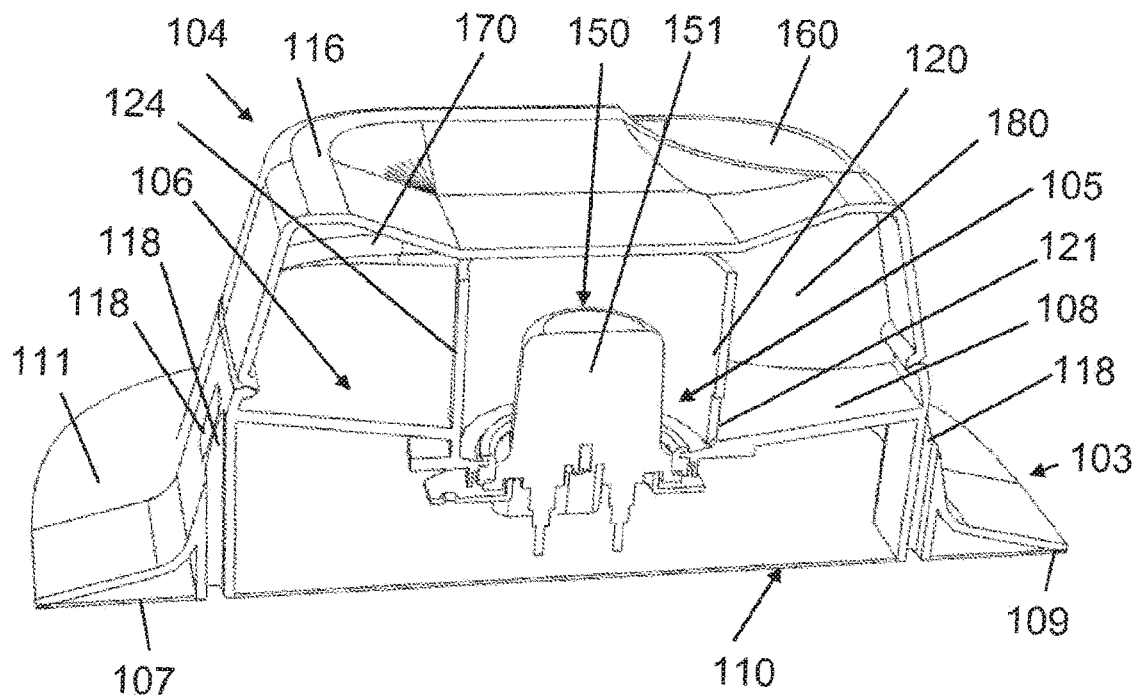

The invention will be more fully understood in consideration of two embodiment examples, which are in no way restrictive, illustrated in the attached FIGS. 1 to 4, in which:

The attached FIG. 1 is a schematic and cross-sectional elevation of a first embodiment example of an electric steam cooker comprising a steam cooker accessory according to the invention, FIG. 2 is an exploded perspective cross-sectional view of a second embodiment example of an electric steam cooker comprising a steam cooker accessory according to the invention, FIG. 3 is a perspective cross-sectional view of the steam cooker accessory illustrated in FIG. 2, according to another orientation, FIG. 4 is a perspective cross-sectional view of the steam cooker accessory illustrated in FIGS. 2 and 3, according to another cross-sectional area.

The electric steam cooker 1 illustrated schematically in FIG. 1 is an appliance for steam heating and/or cooking foods, comprising a container 2 to contain the foods to be heated and/or cooked, and a cover 3 provided to rest on the container 2. For this purpose, the cover 3 has a lower face 7 provided to be positioned on the container 2.

The cover 3 comprises a steam cooker accessory 4 for steam heating and/or cooking foods contained in the container 2.

More specifically, in the embodiment example illustrated in FIG. 1, the cover 3 forms a steam cooker accessory 4 for steam heating and/or cooking foods contained in the container 2. As a variant, the cover 3 may in particular comprise a support device, if desired a removable one, provided to hold the steam cooker accessory 4, and to rest on the container 2.

The steam cooker accessory 4 comprises a steam generator 5 and a water tank 6. The water tank 6 is removable in relation to the steam generator 5, and the steam generator 5 holds the removable water tank 6. The steam generator 5 comprises a water inlet 14 supplied with water by the water tank 6 positioned on the steam generator 5. The steam generator 5 comprises a steam production chamber 20. The water tank 6 supplies the steam production chamber 20 with water. For this purpose, the steam production chamber 20 has a water supply inlet 21 supplied with water by the water tank 6 positioned on the steam generator 5. The steam production chamber 20 comprises a heating device 50 to transform the water in the steam production chamber 20 into steam. The steam production chamber 20 has at least one steam exhaust outlet 22. The steam production chamber 20 is connected to at least one steam delivery outlet 15 provided in a lower part 10 of the steam generator 5.

More specifically, the steam generator 5 has an annular lower bearing surface 9 provided to rest on the container 2. The water inlet 14 of the steam generator 5 is arranged in an upper face 19 of the steam generator 5. The water inlet 14 forms a funnel. The water inlet 14 discharges to the water supply inlet 21 of the steam production chamber 20. The steam generator 5 has a lower wall 13 in which is formed the said at least one steam delivery outlet 15. The steam generator 5 has at least one vent 18 bringing the lower part 10 of the steam generator 5 into communication with an external part 11 of the steam generator 5 extending above the lower part 10. The said at least one vent 18 is surrounded by the annular lower bearing surface 9. The steam generator 5 has an external side wall 12 extending below the water tank 6 positioned on the steam generator 5. The said at least one vent 18 discharges in the external side wall 12.

In the embodiment example illustrated in FIG. 1, the heating device 50 is arranged in the bottom of the steam production chamber 20. The heating device 50 may in particular comprise a screen-printed heating element, or a reinforced heating element positioned under a heat diffusion plate and/or in a heat diffusion plate. As a variant, the heating device 50 could in particular be arranged inside the steam production chamber 20.

According to a preferred embodiment, the steam production chamber 20 has at least one steam exhaust outlet 22, positioned higher than the water supply inlet 21, the said at least one steam exhaust outlet 22 communicating with the said at least one steam delivery outlet 15.

In the embodiment example illustrated in FIG. 1, the steam production chamber 20 has several steam exhaust outlets 22 positioned higher than the water supply inlet 21 and communicating with the steam delivery outlets 15. The steam production chamber 20 is arranged in the steam generator 5 at a distance from the lower wall 13, which permits more freedom in the position of the steam delivery outlets 15. The steam production chamber 20 is arranged in the steam generator 5 at a distance from the external side wall 12.

In the embodiment example illustrated in FIG. 1, the steam generator 5 has several vents 18 bringing the lower part 10 of the steam generator 5 into communication with the external part 11 of the steam generator 5. The lower part 10 forms the lower wall 13. The external part 11 forms the external side wall 12.

The water tank 6 comprises a drain outlet 32 supplying the steam generator 5 with water.

In the embodiment example illustrated in FIG. 1, the steam cooker accessory 4 comprises at least one airway 38 bringing the drain outlet 32 into communication with the outside when the water tank 6 is positioned on the steam generator 5. As is clearly visible in FIG. 1, the said at least one airway 38 is provided between the water tank 6 and the steam generator 5, more specifically between the lower face 33 of the water tank 6 and the upper face 19 of the steam generator 5. The water tank 6 and/or the steam generator 5 may for this purpose have spacers (not pictured in FIG. 1) to separate the lower face 33 of the water tank 6 from the upper face 19 of the steam generator 5. As a variant, the said at least one airway 38 may in particular be provided in the water tank 6 and/or in the steam generator 5.

In the embodiment example illustrated in FIG. 1, the drain outlet 32 is arranged in a lower face 33 of the water tank 6. The lower part of the water tank 6 rests on the upper part of the steam generator 5.

More specifically, the drain outlet 32 extends above the water supply inlet 21 of the steam production chamber 20. The drain outlet 32 presents a valve 34 that can move between a closed position in which the drain outlet 32 is closed and a drainage position in which the drain outlet 32 permits the water to flow out of the water tank 6. Preferably, the water tank 6 comprises at least one bearing surface 36 extending below the valve 34 in the closed position, to prevent inadvertent actions of the valve 34. According to a preferred embodiment, the valve 34 is surrounded by a duct 30 extending below the valve 34 in the closed position.

In the embodiment example illustrated in FIG. 1, the steam generator 5 has a lug 17 pushing the valve 34 toward the drainage position when the water tank 6 is positioned on the steam generator 5. As visible in FIG. 1, the lug 17 is arranged in the steam production chamber 20. The valve 34 is mobile according to a principally vertical position. The valve 34 is pushed toward the closed position by an elastic return element 35. The elastic return element 35 is advantageously formed by a helical spring. The bearing surface 36 is formed by the drain outlet 32. As a variant, the valve 34 may have a lug pushed by the steam production chamber 20 when the water tank 6 is positioned on the steam generator 5.

According to a preferred embodiment, the water tank 6 may be positioned on the steam generator 5 according to several angular orientations. In the embodiment example illustrated in FIG. 1, the water tank 6 may be positioned on the steam generator 5 without special indexing. More specifically, the water inlet 14 is arranged in the central part of the upper face 19 of the steam generator 5.

According to a preferred embodiment, the water tank 6 comprises a gripping device 40. In the embodiment example illustrated in FIG. 1, the gripping device 40 is arranged opposite the drain outlet 32. The gripping device 40 has a bearing surface 41 provided to hold the water tank 6 when the water tank 6 is positioned upside-down.

The water tank 6 may be made of two assembled parts, dismountable if desired, in particular for filling and/or for cleaning. In the embodiment example illustrated in FIG. 1, the lower face 33 of the water tank 6 is formed of a base 42 comprising an orifice 43 around which is mounted a stopper 44 presenting the drain outlet 32. The stopper 44 houses the valve 34. A body 45 is mounted on the base 42. The gripping device 40 conies out of the body 45. The body 45 may be assembled such that it may be dismountable from the base 42. As a variant, the gripping device 40 may notably come out of the base 42, or be connected or fixed on the body 45 or on the base 42. The water tank 6 may comprise a filling orifice distinct from the drain outlet 32. If desired, the filling orifice may be closed.

The electric steam cooker 1 and the steam cooker accessory 4 illustrated in FIG. 1 operate and are used in the following manner.

The user first fills the water tank 6, for example by removing the base 42 from the body 45 after having turned over the water tank 6. The user then places the base 42 back on the body 45 and again turns the water tank 6 over to position the water tank 6 on the steam generator 5. The drain outlet 32 of the water tank 6 then extends in the water inlet 14 of the steam generator 5. The valve 34 is pushed toward the closed position by the steam production chamber 5 when the water tank 6 is positioned on the steam generator 5. The lug 17 then extends inside the duct 30 and pushes the valve 34 toward the drainage position, such that the water coming from the drain outlet 32 of the water tank 6 flows into the water inlet 14 of the steam generator 5 to reach the drain outlet 32 of the water tank 6. The water level rises in the steam production chamber 20 until it reaches the drain outlet 32. The water tank 6 positioned on the steam generator 5 forms a closed chamber 39 above the drain outlet 32. The water cannot flow out of the water tank 6 unless air takes its place. For this purpose, the drain outlet 32 communicating with the outside of the steam cooker accessory 4 through the airway 38 permits air to enter the water tank 6, as long as the water level does not reach the drain outlet 32.

The user then turns on the heating device 50. The temperature of the water in the steam production chamber rises until steam is produced. The steam then escapes via the steam exhaust outlets 22 to reach the steam delivery outlets 15 and spread in the container 2 to cook or heat the foods in the container 2. The production of steam leads the water level in the steam production chamber 20 to drop below the drain outlet 32, which permits the steam production chamber 20 to be resupplied with water. The water can then drain from the water tank 6 via the drain outlet 32, until the water level reaches the drain outlet 32, with air from the outside of the steam cooker accessory 4 passing through the airway 38 to enter through the drain outlet 32 in the water tank 6.

The water tank 6 supplies the steam production chamber 20 with water by gravity. In other words, the water flows from the water tank 6 to supply the steam production chamber 20.

As a variant, the water tank 6 does not necessarily have a valve 34. The drain outlet 32 of the water tank 6 may in particular be calibrated so that the water flow entering the steam production chamber 20 allows the water in the steam production chamber 20 to vaporize without water overflowing from the steam production chamber 20.

As a variant, the water inlet 14 and the water supply inlet 21 may be combined.

As a variant, the water tank 6 may be locked by bayonet closure on the steam generator 5. For this purpose, the water tank 5 may for example comprise tabs provided for attachment by rotation to the steam generator, or vice versa.

As a variant, the steam cooker accessory 4 may comprise a pump to control the flow of water outside the water tank 6 in order to supply the steam production chamber 20. To simplify the electrical connections, the pump may advantageously be arranged in the steam generator 5.

If desired, the steam generator 5 may comprise a support device that can be removed from the steam production chamber 20, such that the steam production chamber 20 rests on said support device and said support device has at least a portion of bearing surface provided to rest on a container.

The support device may in particular have an annular configuration or a "U" configuration. Alternatively, the removable support device may in particular belong to the cover 3.

The electric steam cooker 101 illustrated schematically in FIG. 2 is an appliance for steam heating and/or cooking foods, comprising a container 102 to contain the foods to be heated and/or cooked, and a cover 103 provided to rest on the container 102. For this purpose, the cover 103 has a lower face 107 provided to be positioned on the container 102.

The cover 103 comprises a steam cooker accessory 104 for steam heating and/or cooking foods contained in the container 102.

More specifically, in the embodiment example illustrated in FIGS. 2 to 4, the cover 103 forms a steam cooker accessory 104 for steam heating and/or cooking foods contained in the container 102. As a variant, the cover 103 may in particular comprise a support device, if desired a removable one, provided to hold the steam cooker accessory 104, and to rest on the container 102.

The steam cooker accessory 104 comprises a steam generator 105 and a water tank 106. The water tank 106 communicates with the outside through a filling orifice 160. If desired, the water tank 106 may have at least one other filling orifice.

The steam generator 105 comprises a steam production chamber 120. The water tank 106 supplies the steam production chamber 120 with water by gravity. For this purpose, the water tank 106 communicates via a water supply inlet 121 with the steam production chamber 120. If desired, the water tank 106 may communicate with the steam production chamber 120 through at least one other water supply inlet.

Preferably, the water tank 106 has a bottom 108 discharging to the water supply inlet 121.

In the embodiment example illustrated in FIGS. 2 to 4, the water tank 106 surrounds the steam production chamber 120. For this purpose, an annular wall 124, better visible on FIG. 4, surrounds the steam production chamber 120. The water supply inlet 121 is formed in the annular all 124.

The steam production chamber 120 comprises a heating device 150 to transform the water in the steam production chamber 120 into steam. In the embodiment example illustrated in FIGS. 2 to 4, the heating device 150 comprises a heating pad 151. As a variant, the heating device 150 may in particular comprise a heating element arranged under a heat diffusion plate and/or in a heat diffusion plate forming at least a part of the bottom of the steam production chamber 120.

The steam production chamber 120 is connected to at least one steam delivery outlet 115 provided in a lower part 110 of the steam generator 105. For this purpose, the steam production chamber 120 communicates with at least one steam exhaust outlet 122 positioned higher than the water supply inlet 121. The steam production chamber 120 is confined above the steam exhaust outlet(s) 122. The or each steam exhaust outlet 122 communicates via a duct 125 with the steam delivery outlet(s) 115.

More specifically, in the embodiment example illustrated in FIGS. 2 to 4, the steam production chamber 120 communicates with the steam exhaust outlet(s) 122 through a steam expansion chamber 170 positioned above the steam production chamber 120. In other words, said steam expansion chamber has no communication with the outside of the said at least one steam exhaust 122. A separating side wall 180 is arranged between the filling orifice 160 and the steam expansion chamber 170 in order to prevent the escape of steam from the filling orifice 160. For this purpose, the separating side wall 180 extends lower than the steam exhaust outlet(s) 122. In other words, the separating side wall 180 extends below the steam exhaust outlet(s) 122. More specifically, the separating side wall 180 extends lower than the water supply inlet 121. As is clearly visible in FIGS. 2 to 4, the separating side wall 180 extends in the water tank 106. In other words, the water may reach the two faces of the lower part of the separating side wall 180.

In the embodiment example illustrated in FIGS. 2 to 4, the steam production chamber 120 has several steam exhaust outlets 122 positioned higher than the water supply inlet 121 and communicating via several ducts 125 with the steam delivery outlets 115. More specifically, the ducts 125 are provided in the annular wall 124. Two groups of three ducts 125 are positioned on both sides of the heating pad 151. The ducts 125 are vertical. As a variant, the ducts 125 may be descending rather than vertical. Preferably, the ducts 125 do not have baffles. In other words, the ducts 125 are descending in a continuous manner, without necessarily being straight.

More specifically, the steam generator 105 has an annular lower bearing surface 109 provided to rest on the container 102.

The steam generator 105 has a lower wall 113 in which is/are formed the steam delivery outlet(s) 115. The steam production chamber 120 is arranged in the steam generator 105 at a distance from the lower wall 113, which permits more freedom in the position of the steam delivery outlets 115.

The steam generator 105 has at least one vent 118 bringing the lower part 110 of the steam generator 105 into communication with an external part 111 of the steam generator 105 extending above the lower part 110. The said at least one vent 118 is surrounded by the annular lower bearing surface 109.

The steam generator 105 has an external side wall 112. The bottom 108 of the water tank 106 connects the external side wall 112 to the annular wall 124. The steam production chamber 120 is arranged in the steam generator 105 at a distance from the external side wall 112. The said at least one vent 118 discharges in the external side wall 112.

In the embodiment example illustrated in FIGS. 2 to 4, the steam generator 105 has several vents 118 bringing the lower part 110 of the steam generator 105 into communication with the external part 111 of the steam generator 105. The lower part 110 forms the lower wall 113. The external part 111 forms the external side wall 112. Two groups of three vents 118 are positioned on both sides of the water tank 106 surrounding the steam production chamber 120.

The steam cooker accessory 104 has a top wall 116 advantageously made of transparent or translucent material. The top wall 116 is assembled with the external side wall 112, for example by clipping, bonding, overmolding, screwing or welding. The top wall 116 forms a part of the water tank 106. The separating side wall 180 comes out of the top wall 116. The top wall 116 forms the upper part of the steam expansion chamber 170.

The electric steam cooker 101 illustrated in FIG. 2 and the steam cooker accessory 104 illustrated in FIGS. 2 to 4 operate and are used in the following manner.

The user places the steam cooker accessory 104 on the container 102 after having placed the foods in the container 102. The user fills the water tank 106 through the filling orifice 160. The water flows through the water supply inlet 121 into the steam production chamber 120. Preferably, the user fills the water tank 106 up to a level sufficiently lower than the steam exhaust outlets 122 to prevent the water from reaching the steam exhaust outlets 122 and flowing through the ducts 125. The user then turns on the heating device 150. The temperature of the water in the steam production chamber 120 rises until steam is produced. The steam rises from the steam production chamber 120 to reach the steam expansion chamber 170. The steam is then confined by the top wall 116, by the separating side wall 180 and by the water in the water tank 106. The steam then escapes via the steam exhaust outlets 122 to reach the steam delivery outlets 115 by descending through the ducts 125. The steam exiting the steam delivery outlets 115 spreads in the container 102. The air above the foods can escape through the vents 118. When the foods are saturated with steam, the steam also escapes through the vents 118.

If desired, the steam production chamber 120 may comprise several heating devices.

If desired, the steam generator 105 may comprise a support device that can be removed from the steam production chamber 120, such that the steam production chamber 120 rests on said support device and said support device has at least a portion of bearing surface provided to rest on a container. The support device may in particular have an annular configuration or a "U" configuration. Alternatively, the removable support device may in particular belong to the cover 103.

This invention is in no way limited to the embodiment examples described and their variants, but encompasses many modifications in the context of the claims.

The invention claimed is:

1. A steam cooker accessory for steam heating and/or cooking foods contained in a container, the steam cooker accessory comprising:
   a steam generator configured and arranged to rest on the container, the steam generator having an upper part and a lower part and comprising a steam production chamber provided between said upper part and said lower part,
   a water tank for supplying water to the steam production chamber,
   a heating device configured to transform the water supplied from the water tank into steam,
   the steam production chamber being connected to at least one steam delivery outlet provided in the lower part of the steam generator for delivering the steam to the foods contained in the container,
   wherein the steam generator has at least one vent therein bringing the lower part of the steam generator into communication with an external part of the steam generator extending above the lower part, wherein the at least one vent discharges steam only through an external side wall of the steam generator extending below the water tank, and
   wherein the water tank communicates water via a water supply inlet to the steam production chamber.

2. The steam cooker accessory according to claim 1, wherein the steam generator has an annular lower bearing surface.

3. The steam cooker accessory according to claim 2, wherein the at least one vent is surrounded by the annular lower bearing surface.

4. The steam cooker accessory according to claim 1, wherein the steam production chamber is arranged in the steam generator at a distance from the external side wall.

5. The steam cooker accessory according to claim 1, wherein the steam generator has a lower wall in which is formed the at least one steam delivery outlet and wherein the steam production chamber is arranged in the steam generator at a distance from the lower wall.

6. The steam cooker accessory according to claim 1, wherein the water tank surrounds the steam production chamber.

7. The steam cooker accessory according to claim 1, wherein the wall that separates the water supply tank and the steam production chamber is an annular wall, and wherein the water supply inlet is formed in the annular wall.

8. An electric steam cooker comprising a container to contain foods to be heated and/or steamed, and a cover with a lower face provided to be positioned on the container, wherein the cover comprises a steam cooker accessory for steam heating and/or cooking the foods contained in the container, the steam cooker accessory comprising a steam generator comprising a steam production chamber, and the cooker further comprising a water tank for supplying water to the steam production chamber and a heating device configured to transform the water supplied from the water tank into steam, the steam production chamber being connected to at least one steam delivery outlet provided in a lower part of the steam generator, wherein the steam generator has at least one vent bringing the lower part of the steam generator into communication with an external part of the steam generator extending above the lower part, wherein the at least one vent discharges steam only through an external side wall of the steam generator extending below the water tank, and wherein the water tank communicates water via a water supply inlet to the steam production chamber.

9. The electric steam cooker according to claim 8, wherein the steam generator has an annular lower bearing surface.

10. The electric steam cooker according to claim 9, wherein the at least one vent is surrounded by the annular lower bearing surface.

11. The electric steam cooker according to claim 8, wherein the steam production chamber is arranged in the steam generator at a distance from the external side wall.

12. The electric steam cooker according to claim 8, wherein the steam generator has a lower wall in which is formed the at least one steam delivery outlet and wherein the steam production chamber is arranged in the steam generator at a distance from the lower wall.

13. The electric steam cooker according to claim 8, wherein the water tank surrounds the steam production chamber.

14. The electric steam cooker according to claim 8, wherein the wall that separates the water supply tank and the steam production chamber is an annular wall, and wherein the water supply inlet is formed in the annular wall.

15. A steam cooker accessory for steam heating and/or cooking foods contained in a container, the steam cooker accessory comprising:
   a steam generator having an upper part and a lower part and comprising a steam production chamber provided between said upper part and said lower part,
   a water tank for supplying water to the steam production chamber, the water tank surrounding the steam production chamber,
   a heating device configured to transform the water supplied from the water tank into steam,
   the steam production chamber being connected to at least one steam delivery outlet provided in the lower part of the steam generator for delivering the steam to the foods contained in the container,
   wherein the steam generator has at least one vent therein bringing the lower part of the steam generator into communication with an external part of the steam generator extending above the lower part, wherein the at least one vent discharges steam only through an external side wall of the steam generator extending below the water tank, and
   wherein an annular wall separates the water tank from the steam production chamber, and wherein the water tank communicates water to the steam production chamber via a water supply inlet formed within the annular wall.

16. The steam cooker accessory according to claim 15, wherein the steam generator has an annular lower bearing surface for placement on the container, and wherein the at least one vent is surrounded by the annular lower bearing surface.

17. The steam cooker accessory according to claim 15, wherein the steam generator has a lower wall in which is formed the at least one steam delivery outlet and wherein the steam production chamber is arranged in the steam generator at a distance from the lower wall.

* * * * *